(12) United States Patent
Honorato Ruiz et al.

(10) Patent No.: US 11,858,229 B2
(45) Date of Patent: Jan. 2, 2024

(54) MODULAR TOOLING FOR MULTI-SPAR TORSION BOX

(71) Applicants: AIRBUS OPERATIONS, S.L.U., Madrid (ES); AIRBUS OPERATIONS GMBH, Hamburg (DE)

(72) Inventors: Francisco Javier Honorato Ruiz, Madrid (ES); Eugenio Piñeyroa De La Fuente, Madrid (ES); Alfonso González Gozalbo, Madrid (ES); Ángel Pascual Fuertes, Madrid (ES); Jorge Juan Galiana Blanco, Madrid (ES); Diego García Martín, Madrid (ES); Alfonso Parra Rubio, Madrid (ES); Jorge Martin Beato, Madrid (ES); Carlos Delgado Alcojor, Madrid (ES); Eduardo González Hernando, Madrid (ES); Alberto Gallegos Elvira, Madrid (ES); José Francisco Alonso Rodríguez, Madrid (ES); René Schröder, Hamburg (DE)

(73) Assignees: Airbus Operations, S.L.U., Madrid (ES); Airbus Operations GmbH, Hamburg (DE)

( * ) Notice: Subject to any disclaimer, the term of this patent is extended or adjusted under 35 U.S.C. 154(b) by 262 days.

(21) Appl. No.: 17/159,732

(22) Filed: Jan. 27, 2021

(65) Prior Publication Data
US 2021/0229387 A1    Jul. 29, 2021

(30) Foreign Application Priority Data
Jan. 27, 2020    (EP) .................................... 20382047

(51) Int. Cl.
*B29D 99/00*    (2010.01)
*B64C 1/06*    (2006.01)
(Continued)

(52) U.S. Cl.
CPC .......... *B29D 99/0014* (2013.01); *B64C 1/065* (2013.01); *B64C 3/185* (2013.01); *B64C 3/26* (2013.01); *B29L 2031/3085* (2013.01)

(58) Field of Classification Search
CPC ..... B29D 99/0014; B64C 1/065; B64C 3/185; B64C 3/26; B64C 3/18; B64C 3/20;
(Continued)

(56) References Cited

U.S. PATENT DOCUMENTS 5,387,098 A    2/1995  Willden
5,817,269 A    10/1998 Younie et al.
(Continued)

FOREIGN PATENT DOCUMENTS

EP    2 153 979    2/2010
EP    2 361 753    8/2011
(Continued)

OTHER PUBLICATIONS

Extended Search Report for EP20382047, dated Aug. 13, 2020, 7 pages.

*Primary Examiner* — Brian Handville
(74) *Attorney, Agent, or Firm* — Nixon & Vanderhye P.C.

(57) ABSTRACT

Tooling for manufacturing multi-spar torsion boxes with different web heights, the tooling includes a mandrel module having a hollow beam geometry which comprises a first base and a second base opposite to the first base, and two walls extending between said first base and said second base, and at least one spacer module configured for coupling with the mandrel module, wherein the web height of a multi-spar torsion box is defined by the coupling between the mandrel module and at least one spacer module. A method for manufacturing multi-spar torsion boxes with different web heights.

16 Claims, 7 Drawing Sheets

(51) Int. Cl.
*B64C 3/18* (2006.01)
*B64C 3/26* (2006.01)
*B29L 31/30* (2006.01)

(58) Field of Classification Search
CPC .......... B29L 2031/3085; B29C 33/485; B29C 33/308; B64F 5/10
See application file for complete search history.

(56) References Cited

U.S. PATENT DOCUMENTS

| | | |
|---|---|---|
| 2008/0265093 A1* | 10/2008 | Munoz Lopez ........ B64C 1/065 156/196 |
| 2011/0206875 A1* | 8/2011 | Kohlen ................. B29C 33/485 264/319 |
| 2014/0138486 A1* | 5/2014 | Guinaldo Fernadez ..................... B64C 3/187 156/60 |
| 2017/0259521 A1* | 9/2017 | Kooiman .................. B64C 3/26 |
| 2019/0002082 A1* | 1/2019 | González Gozalbo ... B64C 3/28 |

FOREIGN PATENT DOCUMENTS

| | | |
|---|---|---|
| EP | 2 735 502 | 5/2014 |
| EP | 3 018 719 | 5/2016 |
| EP | 3 421 352 | 1/2019 |

\* cited by examiner

MODULAR TOOLING FOR MULTI-SPAR TORSION BOX

RELATED APPLICATION

This application claims priority to European Patent Application EP20382047.7, filed Jan. 27, 2020, the entirety of which is incorporated by reference.

TECHNICAL FIELD

The present invention belongs to the field of aircraft structures and, more particularly, to the field of modular tooling for manufacturing multi-spar torsion boxes.

BACKGROUND

In the aircraft industry, manufacturers of modern civil passenger aircraft often provide operators with the possibility of either stretching or shrinking the passenger capacity of successful products, such as aircraft families. For example, a customer airline may desire to modify an aircraft to adapt and optimize the passenger or luggage capacity of a specific route. For example, the Airbus A320™ family includes aircraft products such as the A318™ aircraft model which has a relatively short fuselage in the family, and the A321™ aircraft model which is a stretched, e.g., extended, member of the family. Offering different aircraft models within an aircraft family provides aircraft customers, e.g., airlines, with a wide range of aircraft configurations in the aircraft family.

Each aircraft model in a family is designed to meet and guarantee specific mission and performance requirements. From an economical and manufacturing standpoint, manufacturers often build components for aircraft models within a family with a high degree of commonality of components.

The various models within an aircraft family tend to share common components, such as fuselage sections, cockpit, wing, and empennage. In a particular example of a common aircraft structural component, the empennage (VTP: Vertical Tail Plane, and HTP: Horizontal Tail Plane) is generally sized to satisfy the critical requirements of the model with the shortest fuselage in an aircraft family. Sizing a VTP or HTP to the shortest aircraft in an aircraft family allows for commonality of VTP and HTP components across the entire family. However, the common VTP and HTP components may be larger than needed for the members of the family having longer fuselages. A disadvantage of requiring aircraft models in the family with longer fuselages to have an oversized empennage, e.g., oversized VTP or HTP, is that the oversized empennage adds weight and aerodynamic drag to the aircraft as compared to an empennage sized specifically to each of the aircraft models. Thus, a disadvantage of common components is that they are sized to be suited for all models in the family which often results in the components having a greater size that is needed for all but one of the models in the family. Common components that are larger than needed for a particular model can result in the model having extra weight and aerodynamic drag due to the component having a size larger than is needed for the model. Also, the common components may require more material than would be needed if the component were individually sized for the aircraft model. In addition, the maintenance cost and labor may be greater for common components that are larger than needed for a specific aircraft model.

Modular approaches have been developed for different aircraft surfaces structures and components, such as lifting surfaces, wherein some parts of such components are maintained, keeping the same dimensions for all the members of an aircraft family. A modular approach is disclosed in European Patent Application EP 3421352A1, which shows a torsion box modified by increasing the web height of the front and rear spars while maintaining common upper and lower covers. The addition of different leading and trailing edges enables the modification of the lifting surface planform and therefore allows tailoring the size of the lifting surface to the sizing requirements of a particular member of the aircraft family.

However, the current tooling concept for manufacturing said different parts, such as torsion boxes, of the aircraft structures and components, comprises elements such as base plates, caul plates, c-shape mandrels, etc. which have fixed dimensions.

In particular, one of the different parts manufactured using fixed dimensions tooling is a "multi-spar torsion box". This element is understood as a component for an aircraft structure whose main elements are a forward spar, a rear spar, intermediate spars, upper and lower covers and also, if needed, ribs located next to the load introduction areas. Also, a multi-spar torsion box can comprise a plurality of stringers, which are longitudinal stiffening elements configured for supporting a section of the load introduction areas located between spars to prevent buckling and/or bending under compression or shear loads.

In particular, a concept for a multi-spar torsion box is known from European Patent Application EP 2153979A1, wherein an integrated multi-spar torsion box structure of composite material for aircraft and a method for manufacturing an integrated multi-spar torsion box structure of composite material are disclosed.

Accordingly, in case of any dimension change for any of the component parts, such as the torsion box web height, new tooling elements, such as c-shape mandrels, should be manufactured to meet the sizing requirements.

SUMMARY

The present invention may be applied as a solution for the aforementioned problems.

In this application, the terms "composite material" or "composite laminate" will be understood as any type of material, for example CFRP (Carbon Fiber Reinforced Polymers), which comprises two or more physically distinguishable parts and mechanically separable, the two or more parts not being able to dissolve among each other.

The terms "multi-spar torsion box web height" or "multi-spar torsion box height" will be understood as the distance between the upper and lower skins or covers of a multi-spar torsion box.

In a first inventive aspect, the invention provides modular tooling for manufacturing multi-spar torsion boxes with different web heights, the modular tooling comprising: (i) a mandrel module having a hollow beam geometry which comprises a first base and a second base opposite to the first base, and two walls extending between said first base and said second base, and (ii) at least one spacer module configured for coupling with the mandrel module, wherein the web height of a multi-spar torsion box is defined by the coupling between the mandrel module and at least one spacer module.

Therefore, the invention may be configured to provide modular tooling for manufacturing different multi-spar torsion boxes with different sizes, by defining a desired web height, thus allowing size optimization of the multi-spar torsion box in order to meet the sizing requirements of a particular aircraft structure of an aircraft family.

Advantageously, the modular tooling according to the present invention may be applied in industrial processes for manufacturing multi-spar torsion boxes with great flexibility, since the invention allows optimizing the multi-spar torsion box dimensions for a given member of an aircraft family using shared tooling elements.

Also advantageously, this flexibility which allows tailoring the size for the different multi-spar torsion boxes which are part of an aircraft structure consequently improves the performance of said aircraft structure in a particular member of an aircraft family, as the weight and drag can be optimized properly. Therefore, the overall performance of the aircraft is also improved.

The modular tooling allows minimizing the associated modification cost (e.g. avoiding using whole new tooling sets for multi-spar torsion boxes with different size).

Furthermore, potential non-recurring costs are also minimized due to the reduction of the number of specific tooling and jigs thanks to the modular tooling approach in the manufacturing of multi-spar torsion boxes In this sense, in addition to minimizing non-recurring costs, this reduction of the number of specific tooling and jigs also allows reducing the recurring costs associated to the management and maintenance operations (cleaning, movement, etc.).

Additionally, the modular tooling according to the present invention allows reducing the shop floor dedicated, according to the current manufacturing solutions in the state of the art, to store the high amount of tooling required for making different multi-spar torsion boxes at high production rates, also minimizing the investment required to launch new programs Advantageously, regarding the field of application of the present invention, the tooling and method provided are of particular interest in the field of manufacturing a "multi-spar torsion box" in a "one-shot process".

Regarding the "one-shot process", it will be understood as the process of obtaining the final configuration of the multi-spar torsion box, parting from the fresh composite material provided on the different tooling elements, in a single curing process.

The modular tooling according to the invention may comprise one or several spacer modules. In embodiments where the modular tooling comprises more than one spacer module, the spacer modules may have different configurations.

In a particular embodiment, the first base and/or the second base and/or at least one wall of the mandrel module comprises first fastening means, and at least one spacer module comprises second fastening means configured for matching with the first fastening means, thus fixing the mandrel module to the spacer module thereby.

In a particular embodiment, one of the first and second fastening means comprises at least one pin complementary to at least one hole arranged on the other of the first and second fastening means, such that the at least one pin is configured for engaging with the at least one hole.

Therefore, the complementary fastening means implemented in the contact surfaces between the mandrel module and the spacer module, in the form of one or several pins and holes, allows removably fixing the modules among themselves, what improves the consistency and stability of the coupling.

Advantageously, the coupling among modules is secured for preventing unwanted relative movement. Also advantageously, the process of coupling or stacking is provided with improved precision, since the matching between pins and holes helps guiding said coupling among modules, thus resulting in an easier and quicker positioning process.

In an embodiment, both contact surfaces are provided with complementary pins and holes drilled using a NC machine for achieving tight coupling tolerances.

In a particular embodiment, at least one spacer module comprises a hollow beam geometry which comprises a first base and a second base opposite to the first base, and two walls extending between said first base and said second base, and the mandrel module and the spacer module are configured to stack with each other, such that a base of one of the mandrel module and the spacer module is supported on a base of the other of the mandrel module and the spacer module, the stacking thus having a hollow beam geometry, said geometry comprising: (i) two opposed bases, one corresponding to a base of the mandrel module, and the other corresponding to a base of the spacer module, and (ii) two external walls defined by the walls of the mandrel module and the walls of the spacer module.

In an embodiment, the hollow beam geometry of the modules is shaped in the form of a closed cell. Advantageously, all the modules are provided with vacuum tightness.

In an embodiment the first base and/or the second base of the mandrel module comprises first fastening means, and the first base and/or the second base of the spacer module comprises second fastening means configured for matching with the first fastening means, thus fixing one base of the mandrel module to one base of the spacer module thereby.

In a particular embodiment, at least one spacer module is a plank-shaped structure. The spacer module with a shape according to this embodiment is provided with a flat surface and substantially constant thickness. This results in easier management operations, such as handling, cleaning or drilling processes and provides the manufacturing process with great flexibility and reduced complexity.

In a particular embodiment, the mandrel module comprises a first mandrel module member and a second mandrel module member configured for coupling with each other, wherein the first mandrel module member comprises a first base and two walls extending from said first base, the second mandrel module member comprises a second base and two walls extending from said second base, wherein the first wall of the first mandrel module member is configured for abutting the first wall of the second mandrel module member along at least a portion of the length of each wall, each of the other walls of the first mandrel module member and the second mandrel module member comprises a distal end configured for coupling with the at least one spacer module, and wherein the spacer module is configured for interposing between the distal ends of the first and second mandrel module members.

According to this embodiment, the mandrel module is split in two mandrel module members, the two mandrel module members being adapted to move relatively to the other, in order to couple with a spacer module, which is interposed between the two mandrel module members. A set of different predefined positions may be set which allow defining a plurality of heights for producing a set of multi-spar torsion boxes.

On one side, the spacer module comprises an external shape provided with geometric elements, such as flat ridges or wedge-shaped projections, in its perimeter surfaces, configured for abutting and/or matching with the distal end portions of two respective walls of each mandrel module member, this way the spacer module coupling with each mandrel module.

On the other side, the walls of each mandrel module member which are not intended for connecting with the spacer module are configured having a length greater than the walls intended for connecting with the spacer module.

In this sense, said longer walls are configured for mechanically connecting between themselves, such that they can slide on each other. In particular, when the spacer module is set to couple with the mandrel module members in a different position, the defined web height of the coupling changing thereby, said walls slide on each other in order to adapt to the new configuration.

In a particular embodiment, the distal ends configured for coupling with the at least one spacer module each comprises a projection, and wherein the spacer module has a z-shaped body configured for engaging with said projections.

In an embodiment the walls of the mandrel module members intended for connecting with the spacer module comprise first fastening means, and the spacer module comprises second fastening means configured for matching with the first fastening means, thus fixing the walls of the mandrel module members to the spacer module thereby.

In a particular embodiment, the modular tooling for manufacturing multi-spar torsion boxes with different web heights further comprises joint sealing means located at the interfaces between the distal ends of the mandrel module members and the spacer module, the joint sealing means being configured for providing the joint interfaces with air tightness.

Advantageously, the joint interfaces are provided with air tightness in order to avoid any vacuum leakage which may cause a defect in the composite material during the curing process, such as porosity.

In a particular embodiment, the joint sealing means comprise a rubber sealant.

In a particular embodiment, the joint sealing means comprise at least one encapsulated anchor nuts.

Advantageously, a joint provided with said joint sealing means results in a precise sealed joint produced in a simple and quick manner.

In a particular embodiment, at least one spacer module is configured for wrapping the mandrel module, such that the spacer module is adhered to the first and second bases, and to the walls of one mandrel module.

In an embodiment, the spacer module is provided on the mandrel module by an additive layer manufacturing process.

Advantageously, the modular tooling is provided with a tight and continuous control of the height defined by the coupling between the mandrel module and at least one spacer module.

In a particular embodiment, the spacer module configured for wrapping the mandrel module is a composite laminate.

In a particular embodiment, the mandrel module is made of aluminum.

In a second inventive aspect, the invention provides a method for assembling a tooling set for manufacturing a multi-spar torsion box, the method comprising the following steps: (i) providing modular tooling for manufacturing multi-spar torsion boxes according to an embodiment of the first inventive aspect, (ii) defining a web height of the multi-spar torsion box to be manufactured, and (iii) coupling the mandrel module and at least one spacer module for providing the modular tooling with the defined web height of the multi-spar torsion box.

In a particular embodiment, the method for assembling a tooling set for manufacturing a multi-spar torsion box further comprises the following steps: (i) providing at least one additional modular tooling for manufacturing multi-spar torsion boxes according to an embodiment of the first inventive aspect, (ii) defining a chord of the multi-spar torsion box to be manufactured, (iii) coupling at least one additional mandrel module and at least one additional spacer module for providing the additional modular tooling with the defined web height of the multi-spar torsion box, and (iv) arranging the mandrel module coupled to at least one spacer module and the at least one additional mandrel module coupled to an additional spacer module for providing an arrangement with the defined chord.

In other inventive aspect, the invention provides a method for manufacturing a torsion box, the method comprising the steps of the method for assembling a tooling set according to the second inventive aspect and further comprising: (i) providing composite material at least partially covering the coupled mandrel module and spacer module, (ii) providing composite material at least partially covering the coupled at least one additional mandrel module and at least one additional spacer module, and (iii) providing composite material on an upper and lower base of the assembled modular tooling in order to define an upper skin and a lower skin of the multi-spar torsion box.

In a third inventive aspect, the invention provides an aircraft comprising a multi-spar torsion box manufactured by the method according to the second inventive aspect.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION

Figure 1:
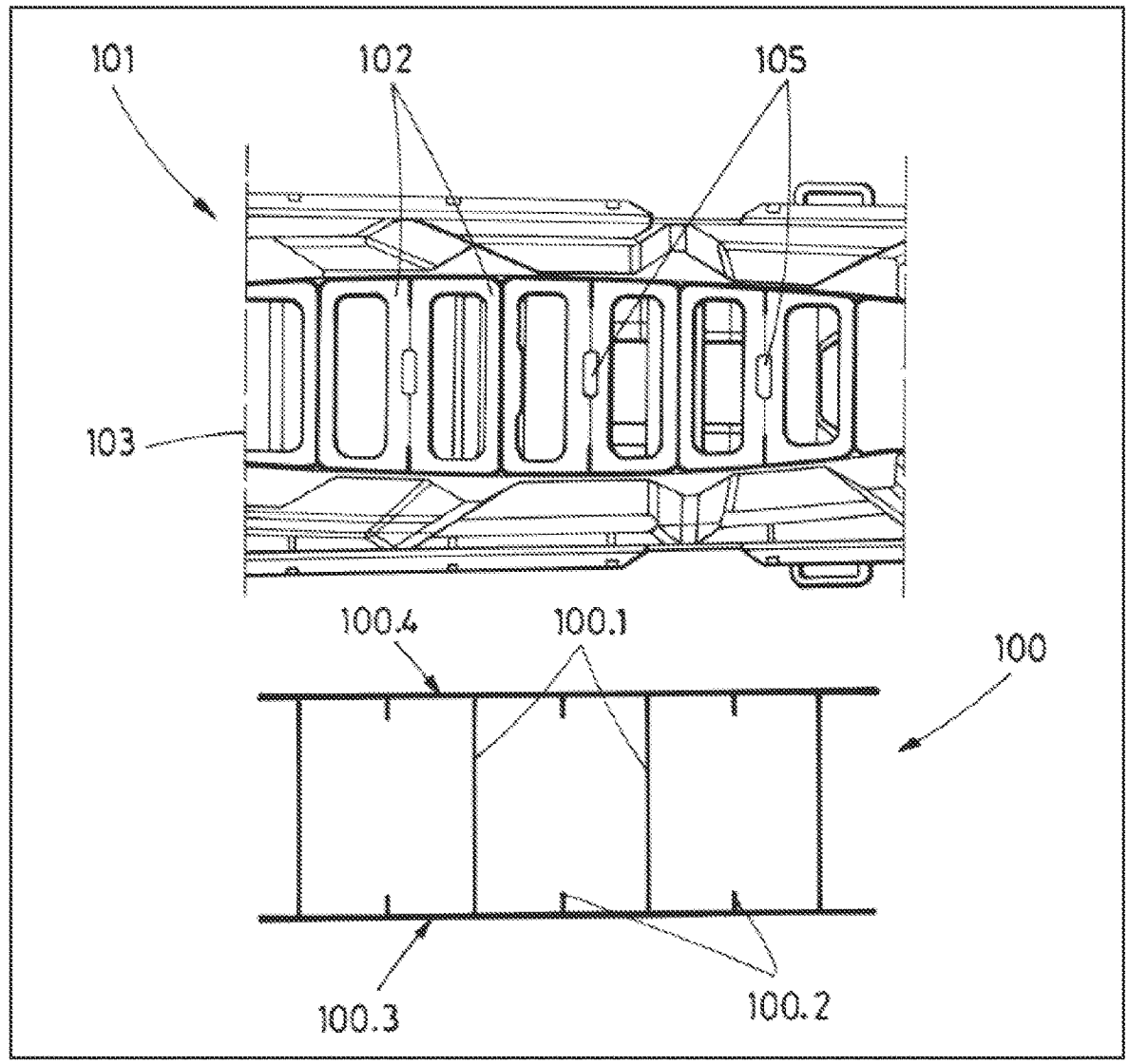
FIG. 1 shows tooling for manufacturing a single configuration of a multi-spar torsion box as previously used in the aircraft industry.

FIG. 1 schematically illustrates a tooling solution currently used in the aircraft industry, along with a top view of an example of a multi-spar torsion box (100). In particular, the tooling (101) comprises several fixed height mandrels (102) for manufacturing a single configuration of a multi-spar torsion box (100). The tooling (101) shown is used to produce a multi-spar torsion box (100) by a hot forming method.

The tooling (101) comprises a base plate (103) which performs the functions of sustaining and transporting the rest of the elements which are part of the tooling (101) required for applying a thermodynamic process to the multi-spar torsion box (100) made of composite material, while ensuring fulfilment of the restrictive structural and dimensional tolerances.

Different layers of composite material are provided along part of the external surface of the mandrels (102), obtaining the desired distribution of composite material which will undergo the curing process. In particular, in FIG. 1 the composite material is distributed following a C-shape pattern, such that the mandrels (102) can be distributed by alternating the orientation of the C-shape pattern for producing the spars (100.1) by bringing together two walls completely covered with composite material; and for producing several stringers or stiffening elements (100.2) by connecting the walls which are only partially covered with composite material.

In this sense, several mandrels (102) are shown assembled together with fresh composite laminates layered so as to provide the structure with its final shape, prior to said curing process, to build the complete multi-spar torsion box (100). Additionally, external Caul plates (103) are used to secure aerodynamic tolerances.

Regarding the fixed height mandrels (102) used in the prior art, as shown in FIG. 1, they are built by welding two C-shape aluminum beams and are assembled and coordinated among themselves by means of longitudinal rods (105) with hippodrome shape.

Using this tooling (101), it is possible to manufacture a multi-spar torsion box (100) combining skins (100.3, 100.4), stringers (100.2) and spars (101.1). As every mandrel (102) has a predefined fixed shape, in case of any multi-spar torsion box (100) height change, new mandrels (102) should be implemented for producing the required structure (100).

Figure 2:
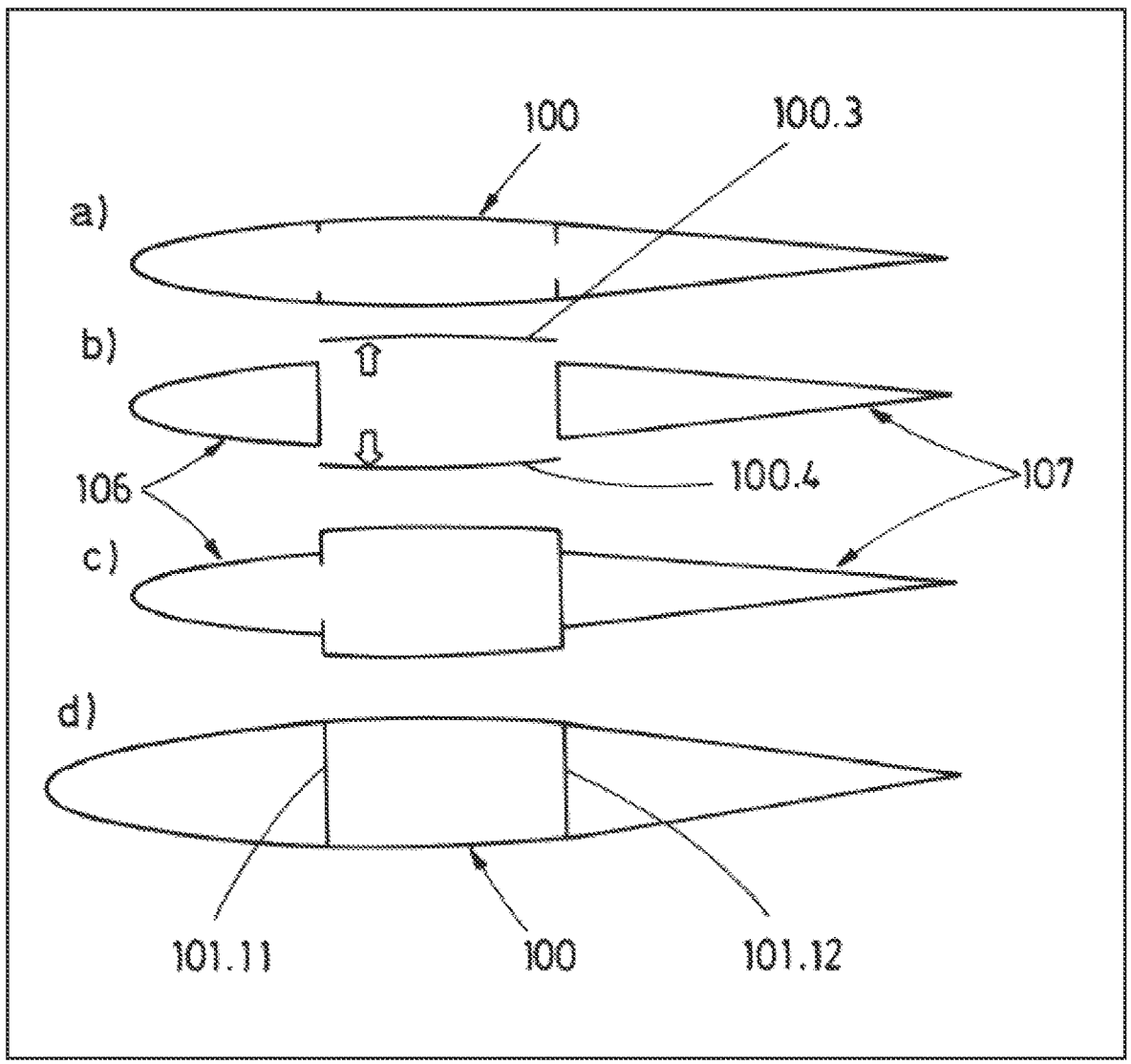
FIG. 2 is a schematic representation of the modularity principle of multi-spar torsion boxes with different web heights produced by the tooling according to the present invention.

FIG. 2 schematically illustrates the principle of the invention using a set of modular lifting surfaces as an example. In this example, the multi-spar torsion box (100) is modified only by varying the web height of the front and rear spars (101.11, 101.12) while maintaining common upper (100.3) and lower skins (100.4). Then, the addition of different leading edges (LE) (106) and different trailing edges (TE) (107) enables the modification of the lifting surface planform and therefore allows tailoring the size of the lifting surface to the sizing requirements of a particular member of the aircraft family.

It is to be noted that FIG. 2 is simply a schematic representation of the concept and the implied increase in relative thickness (t/c, thickness-to-chord ratio) has not be taken into account. It is assumed that the different multi-spar torsion boxes (100) with different heights corresponding to each embodiment compensate the increase in loads due to the longer chords for the leading and trailing edges (LE and TE) due to the increased web height.

Further, for the sake of simplicity, FIG. 2 does not show an increase in trailing edge chord.

Figure 3:
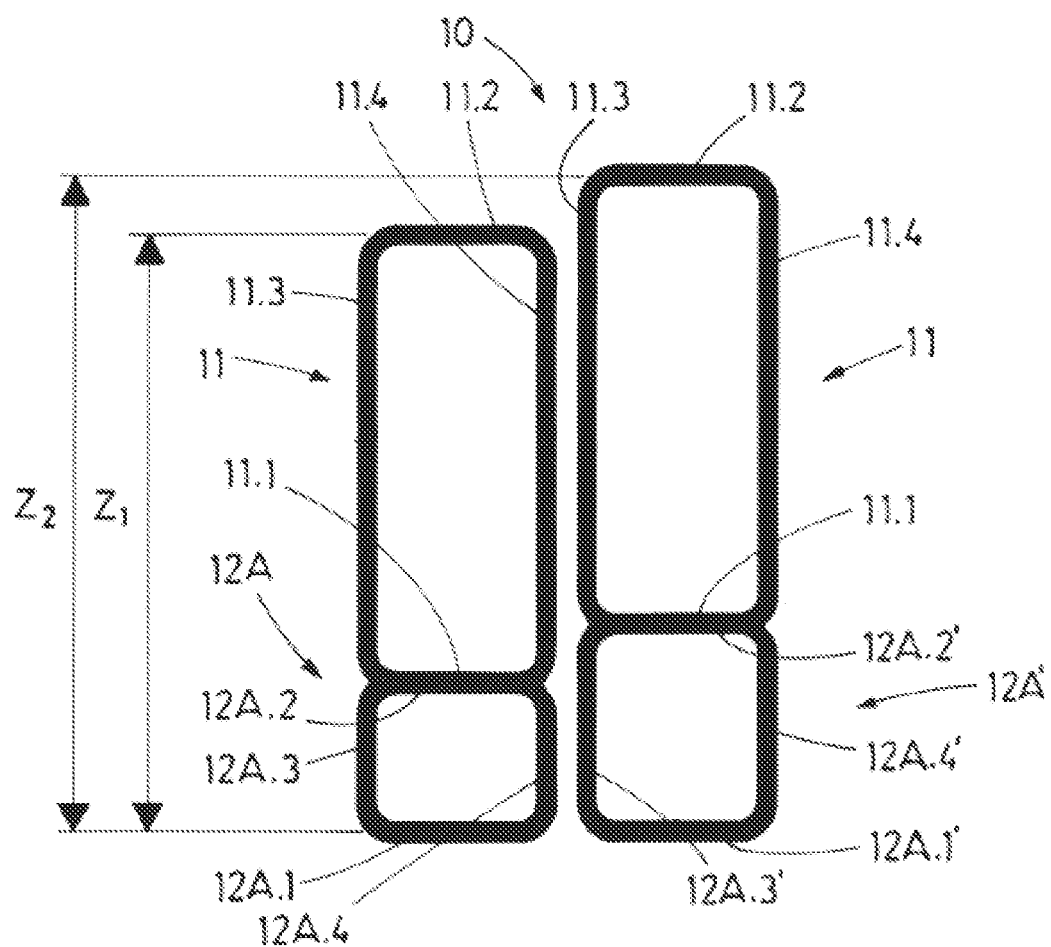
FIG. 3 shows a schematic representation of two different configurations of modular tooling according to an embodiment of the present invention, each configuration defining a different web height for manufacturing a multi-spar torsion box.

FIG. 3 shows a schematic representation of a front view of two different configurations of modular tooling (10) for manufacturing multi-spar torsion boxes (100) with different web heights (z1, z2) according to an embodiment of the present invention.

In particular, the Figure to the left shows one mandrel module (11) coupled to a spacer module (12A), and the Figure to the right shows the same mandrel module (11) coupled to a bigger spacer module (12A'), thus allowing to produce a higher multi-spar torsion box (100) for a different structure of an aircraft (1000) of the family.

Accordingly, the same modular tooling (10) allows providing different web heights to a set of multi-spar torsion boxes (100), thus tailoring the size of said multi-spar torsion boxes (100) to the sizing requirements of a particular member of an aircraft (1000) family.

The spacer modules (12A, 12A') shown comprise a hollow beam geometry, with a first flat bottom base (12A.1, 12A.1'), substantially parallel to a second flat top base (12A.2, 12A.2'), which is spaced apart from the first flat bottom base (12A.1, 12A.1') a distance determined by two parallel walls (12A.3, 12A.4; 12A.3', 12A.4') which extend substantially perpendicularly between the first flat bottom base (12A.1, 12A.1') and the second flat top base (12A.2, 12A.2').

Similarly, the mandrel module (11) comprises a hollow beam geometry, with a first flat bottom base (11.1), substantially parallel to a second flat top base (11.2), which is spaced apart from the first flat bottom base (11.1) a distance determined by two parallel walls (11.3, 11.4) which extend substantially perpendicularly between the first flat bottom base (11.1) and the second flat top base (11.2).

In both left and right stacks of mandrel and spacer modules shown in FIG. 3, the mandrel module (11) and the spacer module (12A, 12A') are stacked one on the other to form a vertical column. The mandrel module (11) being supported on top of a respective spacer module (12A, 12A'), such that the first flat bottom base (11.1) of the mandrel module (11) is supported on the second flat top base (12A.2, 12A.2') of the respective spacer module (12A, 12A').

The width of the mandrel module (11) is the distance between the walls (11.3, 11.4) and is equal to the width of each spacer modules (12A, 12A'). Thus, the stacking (15) of the mandrel module (11) and each spacer module (12A, 12A') forms a substantially rectangular geometry comprising two closed cells.

Figure 4:
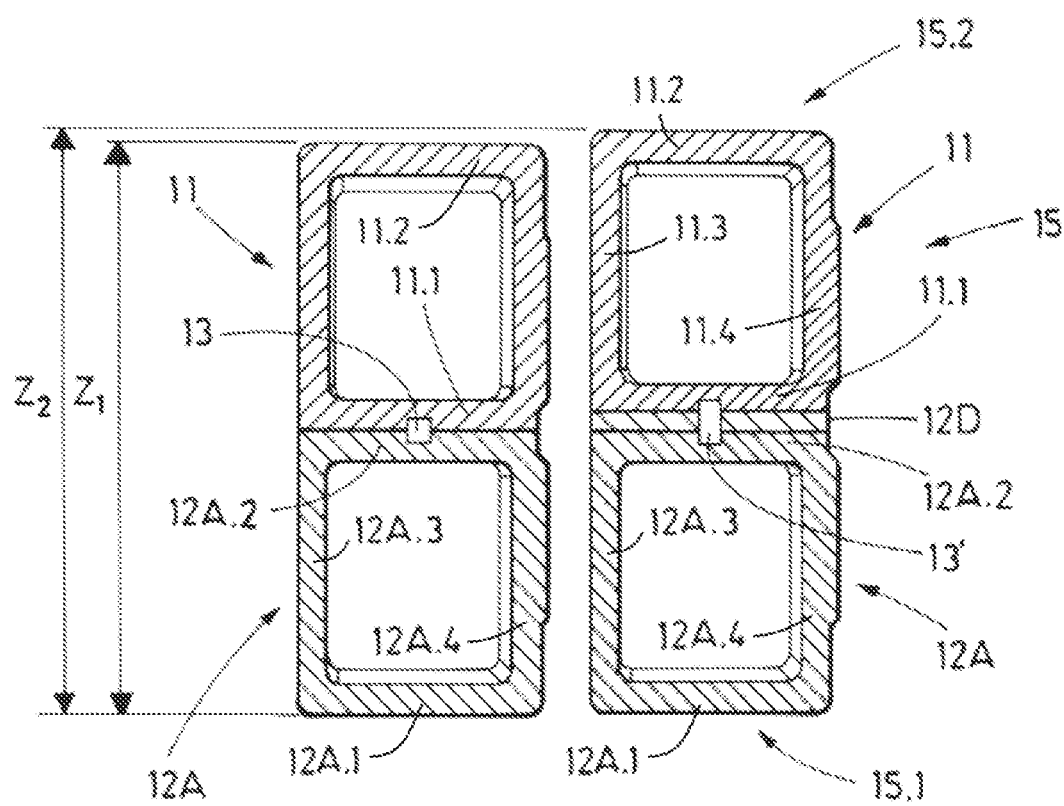
FIG. 4 shows two different configurations of a modular tooling set according to an embodiment of the present invention, each configuration defining a different web height for manufacturing a multi-spar torsion box.

FIG. 4 shows a front view of two different configurations of modular tooling (10) for manufacturing multi-spar torsion boxes (100) with different web heights (z1, z2) according to an embodiment of the present invention.

In FIG. 4, the stack on the left shows a mandrel module (11) coupled to a spacer module (12A), and the stack to the right shows the same mandrel module (11) coupled to the same spacer module (12A) and to an additional spacer module (12D) in the form of a plank-shaped structure, for reaching a height (z2) greater than the height (z1) reached without the plank-shaped structure (12D), thus allowing to produce a higher multi-spar torsion box (100) for a different structure of an aircraft (1000) of the family.

The shared spacer module (12A) shown comprise a hollow beam geometry, with a first flat bottom base (12A.1), parallel to a second flat top base (12A.2), which is spaced apart from the first flat bottom base (12A.1) a distance determined by two parallel walls (12A.3, 12A.4) which extend perpendicularly between the first flat bottom base (12A.1) and the second flat top base (12A.2).

In the stack to the left in FIG. 4, the mandrel module (11) and the spacer module (12A) are stacked in the same manner than the embodiments shown in FIG. 3. This is, the mandrel module (11) is supported on top of the spacer module (12A), such that the first flat bottom base (11.1) of the mandrel module (11) is supported on the second flat top base (12A.2) of the spacer module (12A). Further, the width of the mandrel module (11), this is, the distance between the walls (11.3, 11.4) is equal to the width of the spacer modules (12A). Thus, the stacking (15) of the mandrel module (11) and the spacer module (12A) has a substantially rectangular geometry, comprising two closed cells.

However, in the stack to the right in FIG. 4, the plank-shaped structure (12D) is interposed between the mandrel module (11) and the spacer module (12A), such that the first flat bottom base (11.1) of the mandrel module (11) is supported on a top surface of the plank-shaped structure (12D), and the plank-shaped structure (12D) is supported on the second flat top base (12A.2) of the spacer module (12A).

Additionally, both stacks in FIG. 4 with and without the plank-shaped structure (12D) interposed therebetween comprise complementary fastening means for guiding the coupling process and for fixing said coupling once it has been completed.

In particular, in the stack to the left in FIG. 4, the mandrel module (11) and the spacer module (12A) comprise a blind hole drilled in the contact surfaces (11.1, 12A.2) of the stacking using a numerical control (NC) machine for achieving tight tolerances and allowing precise coordination between both holes, so that a pin (13) can penetrate both holes, substantially perpendicularly to both contact surfaces (11.1, 12.2), thus securing the coupling. In the same manner, in the figure to the right, the plank shaped structure (12D) stacked between the mandrel module (11) and the spacer module (12A) has been drilled in coordination with the holes of the contact surfaces (11.1, 12A.2) so that a longer pin (13') can pass through the whole stacking (15), thus fixing the stacking among the mandrel module (11), the plank-shaped structure (12D) and the spacer module (12A).

Figure 5:
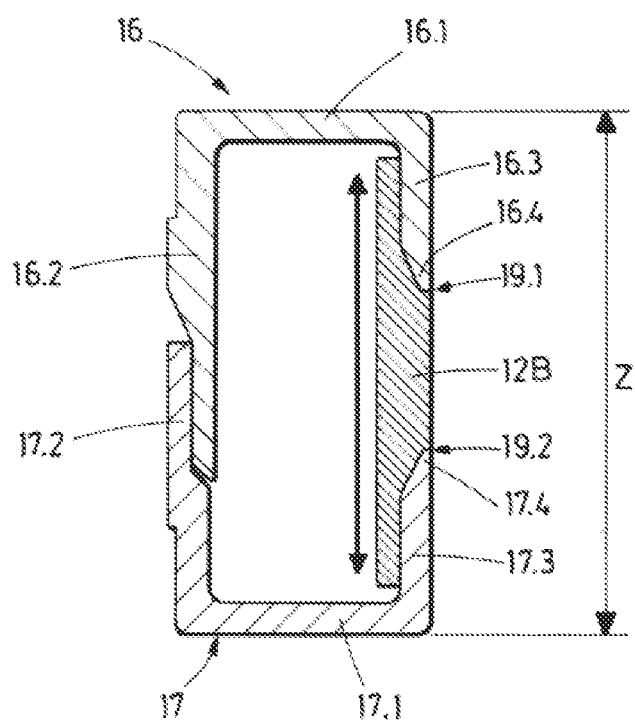
FIG. 5 shows modular tooling according to an embodiment of the present invention, wherein two mandrel module members and one spacer module are coupled defining a web height for manufacturing a multi-spar torsion box.

FIG. 5 shows a front view of a configuration of a mandrel module (11) coupled to a spacer module (12B) of modular tooling (10) for manufacturing multi-spar torsion boxes (100) according to another embodiment of the invention, wherein the mandrel module (11) is split in a first (16) and second (17) mandrel module members.

In particular, the first mandrel module member (16) comprises a first base (16.1), a first wall (16.2) and a second wall (16.3) extending from said first base (16.1); and the second mandrel module member (17) comprises a second base (17.1), a first wall (17.2) and a second wall (17.3) extending from said second base (17.1).

On one side, the first wall (16.2) of the first mandrel module member (16) is shown abutting the first wall (17.2) of the second mandrel module member (17) along a portion of their lengths. Both first walls (16.2, 17.2) are configured for sliding on each other, such that, when the spacer module (12B) is replaced, or is set to couple with the mandrel module members (16, 17) in a different position, the defined web height (z) of the coupling changes thereby, said walls (16.2, 17.2) sliding on each other in order to adapt to the new configuration.

In this sense, said first walls (16.2, 17.2) are illustrated comprising a thickness reduction along the portion of their lengths configured for mechanically connecting the other respective first wall (16.2, 17.2). This way, the length of the portion in contact is maximized, such that both first walls (16.2, 17.2) can slide on each other along a plurality of configurations for defining different web heights for a multi-spar torsion box (100) to be manufactured. In particular, upon a change in the defined web height of the coupling due to a replacement or a change in the position of the spacer module (12B) interposed between both mandrel module members (16, 17), said first walls (16.2, 17.2) slide on each other in order to adapt to the new configuration, while remaining in mechanical contact, thus preventing the inner hollow volume from any vacuum leakage.

On the other side, the spacer module (12B) is shown interposed between the distal ends (16.4, 17.4) of the second walls (16.3, 17.3). In this sense, the distal end (16.4, 17.4) portions of both mandrel module members (16, 17) slope obliquely towards the joint interfaces (19.1, 19.2). In a similar manner, the spacer module (12B) shown has a portion substantially shaped as a trapezium, comprising two sloping surfaces configured for abutting the distal ends (16.4, 17.4) along said joint interfaces (19.1, 19.2).

This particular configuration with oblique surfaces in mechanical contact along the joint interfaces (19.1, 19.2) provides the modular tooling (10) with continuous height adjustment as a result of the potential coupling options for the mandrel module members (16, 17) and the spacer module (12B) along the joint interfaces (19.1, 19.2).

Figure 6:
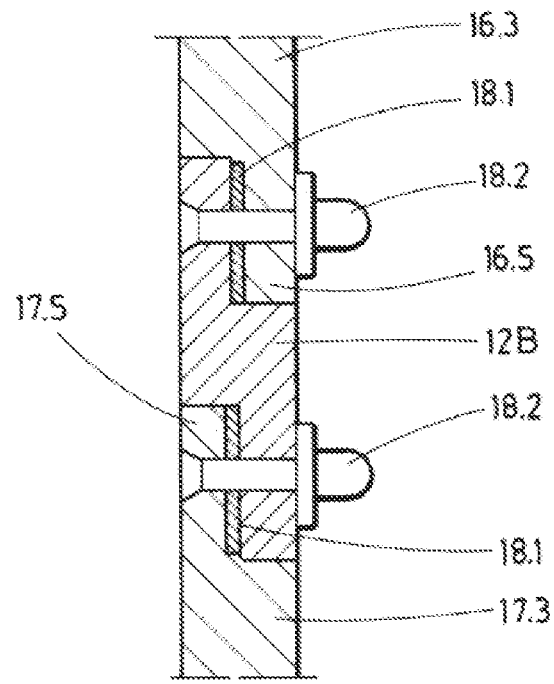
FIG. 6 shows two different configurations of the joint between a z-shaped spacer module and the projections of the distal ends of two mandrel module members according to an embodiment of the present invention.

FIG. 6 shows an alternative embodiment for replacing the oblique surfaces in mechanical contact at the joint interfaces (19.1, 19.2) shown in FIG. 5. In particular, the figure shows a particular embodiment of a coupling between the distal ends (16.4, 17.4) of the mandrel module members (16, 17) and the spacer module (12B) achieved by means of two rectangular projections (16.5, 17.5) which are provided only on a portion of the contact surfaces of distal ends (16.4, 17.4), since the rest of the surface is configured for matching with the spacer module (12B), which, in this particular embodiment, is in the form of a z-shaped body.

Therefore, said z-shaped body (12B) is configured for matching with the projections (16.5, 17.5) of each respective distal end (16.4, 17.4), thus being interposed between them.

Further, since securing inner tightness along the composite curing cycle is necessary to ensure that the cycle is performed in proper conditions which prevents defects due to vacuum leakage, such as porosity, the joint interfaces (19.1, 1.2) have been provided with flat rubber sealants (18.1) which are interposed between the contact surfaces of both the rectangular projections (16.5, 17.5) and the z-shaped body (12B).

Apart from the addition of flat rubber sealants (18.1), in order to improve the sealant effect, as well as the stability of the coupling, an encapsulated anchor nut (18.2) along with a sealant ring has been provided at each joint interface (19.1, 19.2).

Figure 7:
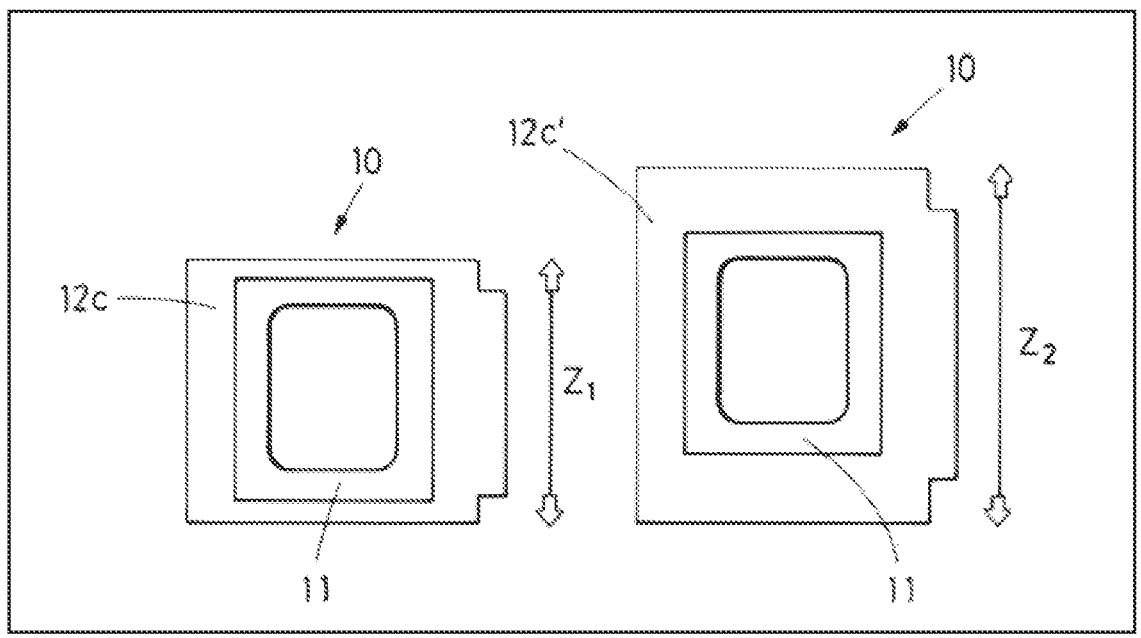
FIG. 7 shows a schematic representation of two different configurations of modular tooling according to an embodiment of the present invention, each configuration defining a different web height for manufacturing a multi-spar torsion box.

FIG. 7 shows a front view of two different configurations of modular tooling (10) for manufacturing multi-spar torsion boxes (100) with different web heights (z1, z2) according to an embodiment of the present invention.

The modular tooling to the left in FIG. 7 shows one mandrel module (11) coupled to a spacer module (12C). The modular tooling to the right in FIG. 7 shows the same mandrel module (11) coupled to a bigger spacer module (12C'), thus allowing to produce a higher multi-spar torsion box (100) for a different structure of an aircraft (1000) of the family.

In particular, the spacer module (12C, 12C') is provided directly on the mandrel module (11) by an additive layer manufacturing process. More in particular, the modular tooling to the left in FIG. 7 shows a mandrel module (11) made of aluminum, wherein the two opposed bases (11.1, 11.2) and the walls (11.3, 11.4) have been completely surrounded by a composite laminate which has been provided directly on the outer surface of the mandrel module (11), thus wrapping said mandrel module (11), by braiding technology.

Thus, the length of the walls (11.3, 11.4) of the mandrel module (11), along with the thickness of the spacer module (12C) coupled thereto, resulting from the amount of composite material provided on the mandrel module (11), define a total height (z1) corresponding to the web height of a multi-spar torsion box (100) to be manufactured.

Regarding the modular tooling shown to the right in FIG. 7, additional composite material has been deposited surrounding the mandrel module (11), thus reaching a greater height (z2) which allows producing a higher multi-spar torsion box (100)

Figure 8:
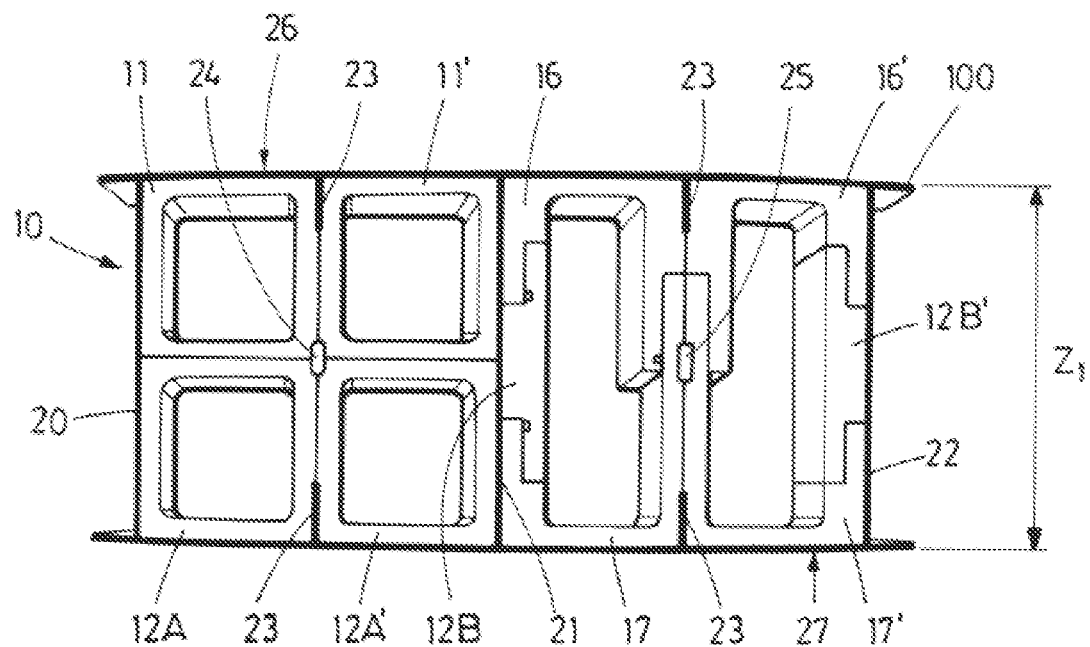
FIG. 8 shows a modular tooling comprising several configurations of a coupling between a mandrel module and a spacer module, arranged in combination for manufacturing a multi-spar torsion box.

FIG. 8 shows modular tooling (10) comprising several configurations of a coupling between a mandrel module (11) and a spacer module (12A), arranged in combination for manufacturing a multi-spar torsion box (100), according to the steps of a method for manufacturing multi-spar torsion boxes (100) with different web heights according to the present invention.

In particular, a distance z1 has been determined as the web height of a multi-spar torsion box (100) to be manufactured. Then, two mandrel modules (11, 11') have been coupled to respective spacer modules (12A, 12A') tailored for achieving the web height determined (z1), according to the embodiments shown in FIG. 3. Later on, the mandrel modules (11, 11') and the spacer modules (12A, 12A') coupled thereto have been provided with composite material distributed according to a C-shape pattern.

Then, the two mandrel modules (11, 11') coupled to respective spacer modules (12A, 12A') have been arranged and coordinated among themselves by means of a longitudinal rod with hippodrome shape (24), such that two stringers (23) have been defined by bringing together the walls partially covered with composite material. Further, a first spar (20) has been defined by the composite material provided on one of the walls completely covered with composite material.

In a similar manner, two mandrel modules which are each split in two respective mandrel module members (16, 17; 16', 17') coupled with each other have been coupled to respective spacer modules (12B, 12B') tailored for achieving the web height determined (z1), according to the embodiments shown in FIG. 5. Later on, the mandrel module members (16, 17; 16', 17') and the spacer modules (12B, 12B') coupled thereto have been provided with composite material distributed according to a C-shape pattern.

Then, the mandrel module members (16, 17; 16', 17') coupled to respective spacer modules (12B, 12B') have been arranged and coordinated among themselves by means of a longitudinal rod with rectangular shape (25), such that two stringers (23) have been defined by bringing together the walls partially covered with composite material. Further, a second spar (22) has been defined by the composite material provided on one of the walls completely covered with composite material.

Then, the four mandrel modules and respective spacer modules have been further assembled and coordinated among themselves in order to define an intermediate spar (21) by bringing together the other walls completely covered with composite material of each arrangement corresponding to the embodiments of FIGS. 3 and 5.

Then, composite material has been provided on both the upper and lower base of the assembled modular tooling (10) in order to define the upper skin (26) and lower skin (27) of a multi-spar torsion box (100).

Figure 9:
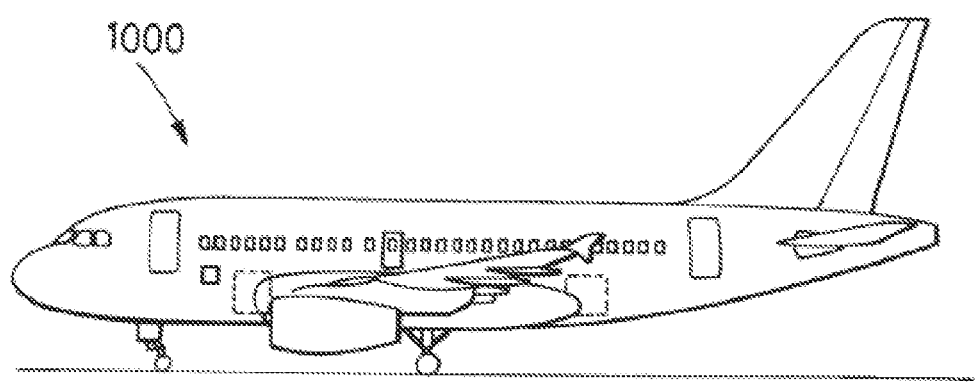
FIG. 9 shows an aircraft comprising a multi-spar torsion box manufactured according to an embodiment of the present invention

FIG. 9 shows an aircraft (1000) comprising a multi-spar torsion box (100) manufactured that embodies the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A modular tooling configured to manufacture multi-spar torsion boxes of different web heights, the modular tooling comprising:
   a mandrel module including a hollow beam geometry which comprises a first base, a second base opposite to the first base, and two walls extending between said first base and said second base, and
   at least one spacer module configured to couple with the mandrel module, wherein the at least one spacer module is selected from a plurality of spacer modules each having a common width and a different height;
   wherein a web height of a multi-spar torsion box being formed by a stack of the mandrel and the at least one spacer module is defined by the stack, and
   wherein the stack and the mandrel module each have a width substantially the same as the common width of each of the at least one spacer module.

2. The modular tooling of claim 1, wherein at least one of the first base, the second base and a wall of the two walls of the mandrel module comprises a first fastener, and
   wherein the at least one spacer module comprises a second fastener configured to engage the first fastener to fix the mandrel module to the at least one spacer module.

3. The modular tooling of claim 2, wherein one of the first fastener and the second fastener comprises at least one pin complementary to at least one hole arranged on the other of the first fastener and the second fastener, wherein the at least one pin is configured to engage the at least one hole.

4. The modular tooling of claim 1, wherein the at least one spacer module includes a hollow beam geometry comprising a first spacer module base and a second spacer module base opposite to the first spacer module base, and two spacer module walls extending between said first spacer module base and said second spacer module base, and wherein the mandrel module and the at least one spacer module are configured to be stacked such that the first base or the second base of the mandrel module abuts the first or second spacer module base.

5. The modular tooling of claim 4, wherein the stack of the mandrel module and the at least one spacer module includes:

two opposed bases comprising one of the first and second base of the mandrel module, and one of the first and second spacer module bases; and opposite external walls defined by the two walls of the mandrel module and the two spacer module walls.

6. The modular tooling of claim 1, wherein the at least one spacer module includes a plank spacer module and a hollow beam spacer module, wherein the plank spacer module and the hollow beam spacer module are stacked together.

7. A modular tooling configured to manufacture multi-spar torsion boxes of different web heights, the modular tooling comprising:

a mandrel module including a hollow beam geometry which comprises a first base, a second base opposite to the first base, and two walls extending between said first base and said second base, and at least one spacer module configured to couple with the mandrel module, wherein the at least one spacer module is selected from a plurality of spacer modules each having a common width and a different height;

wherein a web height of a multi-spar torsion box being formed by a stack of the mandrel and the at least one spacer module is defined by the stack, wherein the mandrel module comprises a first mandrel module member and a second mandrel module member configured to couple to the first mandrel module member, wherein the first mandrel module member comprises a first mandrel module base and two first mandrel module walls extending from said first mandrel module base, wherein the second mandrel module member comprises a second mandrel module base and two second mandrel module walls extending from said second mandrel module base, wherein a first of the first mandrel module walls is configured to abut a first of the second mandrel module walls, wherein a second of the first mandrel module walls and a second of the second mandrel module walls each comprise a distal end configured to couple with at least one spacer module, and wherein said at least one spacer module is interposed between the distal ends of the first and second mandrel module walls.

8. The modular tooling of claim 7, wherein the distal ends each comprises a projection, and wherein the at least one spacer module has a Z-shaped body configured for engaging with said projections.

9. The modular tooling of claim 8, further comprising at least one sealing joint sealing interfaces between the spacer module and each of the distal ends of the mandrel module members, wherein the sealing joints are configured to provide air tight seals over the interfaces.

10. The modular tooling of claim 9, wherein the at least one sealing joint comprises a rubber sealant and/or at least one encapsulated anchor nut.

11. A modular tooling configured to manufacture multi-spar torsion boxes of different web heights, the modular tooling comprising:

a mandrel module including a hollow beam geometry which comprises a first base, a second base opposite to the first base, and two walls extending between said first base and said second base, and at least one spacer module configured to couple with the mandrel module, wherein the at least one spacer module is selected from a plurality of spacer modules each having a common width and a different height, wherein a web height of a multi-spar torsion box being formed by a stack of the mandrel and the at least one spacer module is defined by the stack, and wherein at least one spacer module is configured to enclose the mandrel module, such that first and second walls of the mandrel module abut interior walls of the at least one spacer module, and the first and second bases of the mandrel module abut interior bases of the at least one spacer module.

12. The modular tooling of claim 11, wherein the at least one spacer module configured to enclose the mandrel module is a composite laminate spacer module.

13. The modular tooling of claim 1, wherein the mandrel module is an aluminum mandrel module.

14. A modular tooling kit configured to manufacture multi-spar torsion box, the modular tooling kit comprising:

a hollow beam mandrel module having a first base, a second base opposite to the first base, and side walls extending between the first and second bases; and a plurality of spacer modules each configured to couple with the mandrel module and each of the spacer modules having a width common to a width of the mandrel module and a height differing from at least one of the other spacer modules;

wherein the mandrel module is stacked with a selected at least one of the spacer modules to form a modular tool stack having a height corresponding to one of a plurality of predefined web heights of the multi-spar torsion box, wherein the modular tool stack and the hollow beam mandrel each have width substantially the same as the width common to the plurality of spacer modules, and wherein the modular tool stack is configured to form a multi-spar torsion boxing having at least one web with a height corresponding to the predefined web height.

15. The modular tooling kit of claim 14, wherein the plurality of spacer modules includes a hollow beam spacer module comprising a first spacer module base and a second spacer module base opposite to the first spacer module base, and two spacer module walls extending between said first spacer module base and said second spacer module base, and wherein the modular tool stack includes the first or second base of the mandrel module abutting the first or second spacer module base.

16. The modular tooling kit of claim 14, wherein the plurality of spacer modules includes a plank spacer module, and the modular tool stack includes the plank spacer module.

* * * * *